(12) United States Patent
Wakalkar et al.

(10) Patent No.: US 11,889,012 B2
(45) Date of Patent: Jan. 30, 2024

(54) SYSTEMS AND METHODS FOR UTILIZING AUGMENTED REALITY TO IDENTIFY AN OPTIMAL LOCATION FOR PROVIDING A WIRELESS NETWORK DEVICE

(71) Applicant: Verizon Patent and Licensing Inc., Basking Ridge, NJ (US)

(72) Inventors: Nitish Sharadchandra Wakalkar, Jersey City, NJ (US); Kelvin K. Chan, Middletown, NJ (US); Nathaniel Drapiza, Ridgewood, NJ (US); Mazen Hammad, Irving, TX (US); Rajat Sharma, Southlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/231,816

(22) Filed: Apr. 15, 2021

(65) Prior Publication Data

US 2022/0337695 A1 Oct. 20, 2022

(51) Int. Cl.
*H04W 64/00* (2009.01)
*H04W 76/10* (2018.01)
*H04W 24/08* (2009.01)
*H04M 1/72403* (2021.01)
*G06T 19/00* (2011.01)
*G06F 3/04842* (2022.01)
*H04W 4/029* (2018.01)

(52) U.S. Cl.
CPC .... *H04M 1/72403* (2021.01); *G06F 3/04842* (2013.01); *G06T 19/006* (2013.01); *H04W 4/029* (2018.02)

(58) Field of Classification Search
CPC .............. H04M 1/72403; H04W 4/029; G06F 3/04842; G06T 19/006
See application file for complete search history.

(56) References Cited

U.S. PATENT DOCUMENTS

| | | | |
|---|---|---|---|
| 9,292,951 B2* | 3/2016 | Mulé | H04N 21/4316 |
| 10,827,322 B1* | 11/2020 | Lal | H04W 4/024 |
| 11,360,310 B2* | 6/2022 | Lawver | G06F 3/011 |
| 2015/0296473 A1* | 10/2015 | Chan | G01S 5/02 455/456.1 |
| 2015/0317829 A1* | 11/2015 | Carter | G06T 7/74 345/633 |
| 2016/0071325 A1* | 3/2016 | Callaghan | H04W 4/02 345/633 |

(Continued)

*Primary Examiner* — Sang H Kim

(57) ABSTRACT

A user device may provide, to a network associated with a base station, user device location data identifying a latitude, a longitude, and a heading of the user device, and may receive base station location data identifying a latitude, a longitude, and signal coverage of the base station. The user device may display a first user interface that includes a user device indication, a base station indication, and a selection option, and may receive a selection of the selection option. The user device may retrieve camera view data and sensor data associated with the user device and may display, based on the camera view data and the sensor data, a second user interface that includes the first user interface overlaid on a camera view of the user device, an augmented reality-based signal strength directional indicator, and an augmented reality-based base station location representation associated with the base station.

20 Claims, 10 Drawing Sheets

(56) References Cited

U.S. PATENT DOCUMENTS

| | | |
|---|---|---|
| 2016/0320625 A1* | 11/2016 | von und Zu Liechtenstein .......... G02B 27/0179 |
| 2017/0059346 A1* | 3/2017 | Gray .................... G01C 21/362 |
| 2017/0127289 A1* | 5/2017 | Belz ...................... H04W 16/18 |
| 2018/0049150 A1* | 2/2018 | Chandwani ........... H04W 76/10 |
| 2018/0123906 A1* | 5/2018 | Liao ...................... G06T 19/006 |
| 2018/0227879 A1* | 8/2018 | Chandwani ........... H04W 76/10 |
| 2020/0005548 A1* | 1/2020 | Edwards ................ G06Q 30/02 |
| 2021/0042992 A1* | 2/2021 | Newman ............... G06T 19/006 |
| 2021/0064126 A1* | 3/2021 | Dong .................. G06F 3/04845 |

* cited by examiner

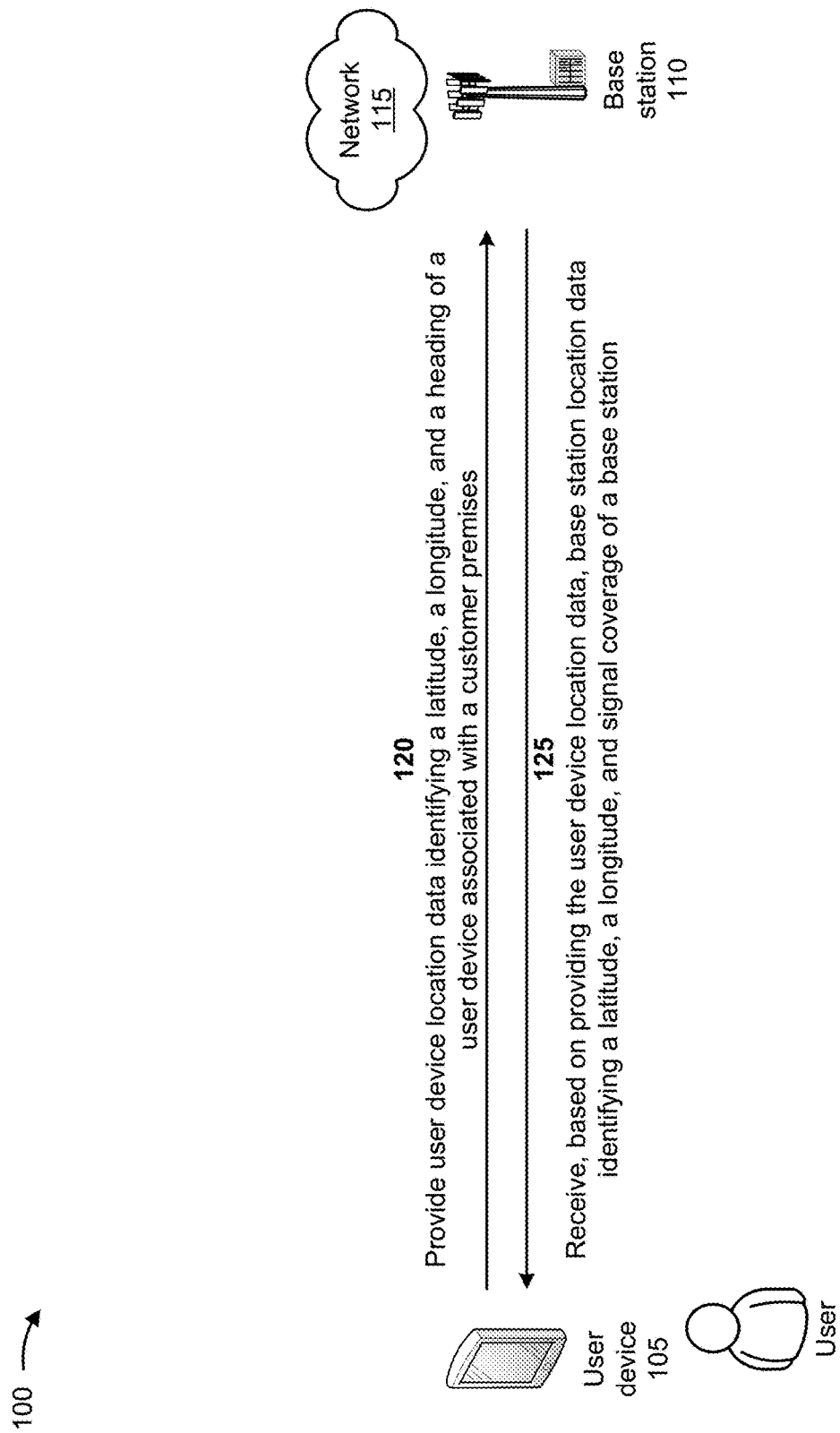

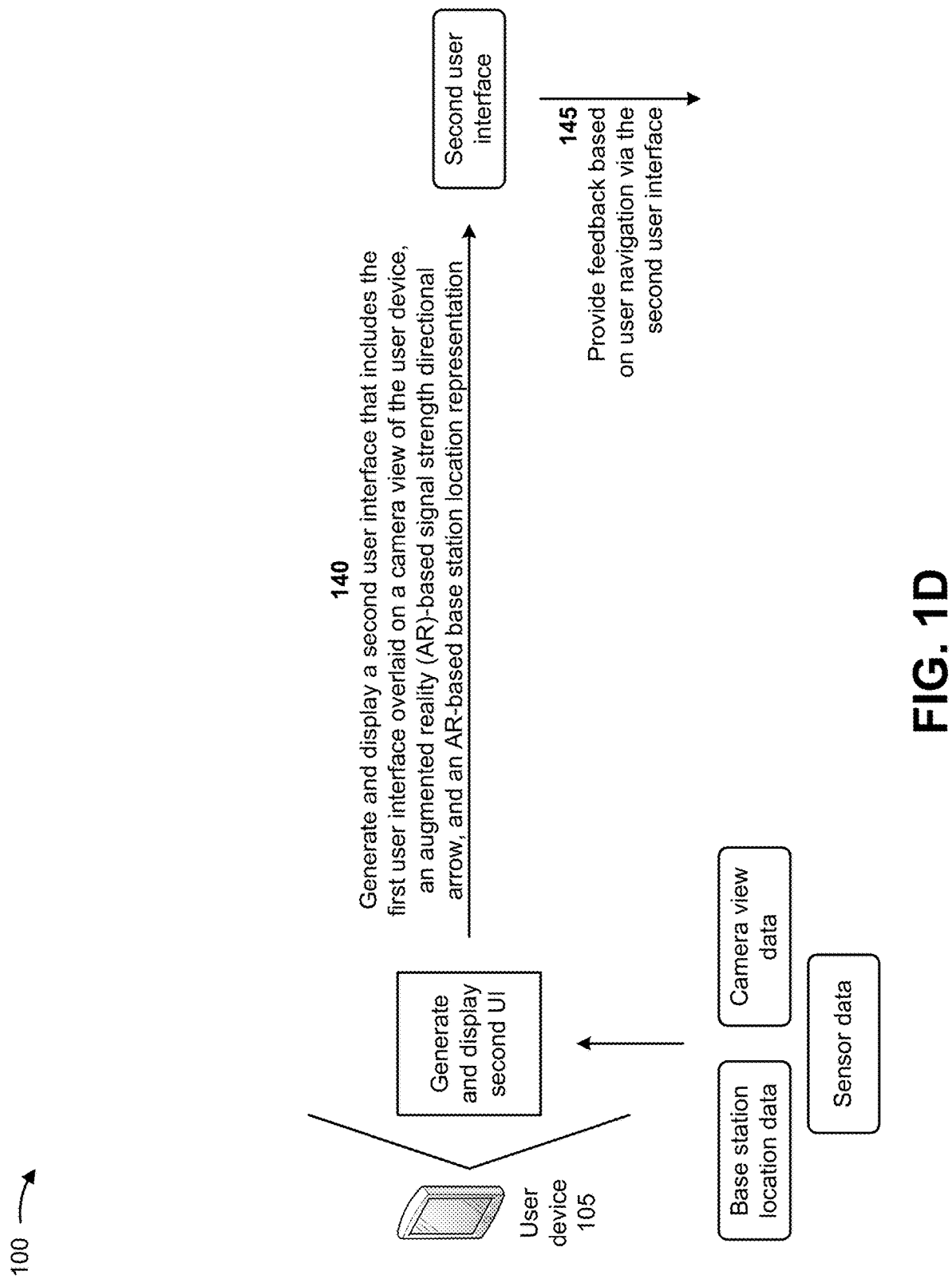

SYSTEMS AND METHODS FOR UTILIZING AUGMENTED REALITY TO IDENTIFY AN OPTIMAL LOCATION FOR PROVIDING A WIRELESS NETWORK DEVICE

BACKGROUND

Extended reality (XR), such as augmented reality (AR), virtual reality (VR), mixed reality (MR), and/or the like, may refer to computer technologies that use software to integrate real and virtual elements and/or audio to create an immersive experience. For example, AR generally refers to interactive technologies in which objects in a real-world environment are augmented using computer-generated virtual content that may be overlaid on the real-world environment.

BRIEF DESCRIPTION OF THE DRAWINGS

FIGS. 1A-1G are diagrams of one or more examples associated with utilizing augmented reality to identify an optimal location for providing a wireless network device.

DETAILED DESCRIPTION OF PREFERRED EMBODIMENTS

Figure 1B:
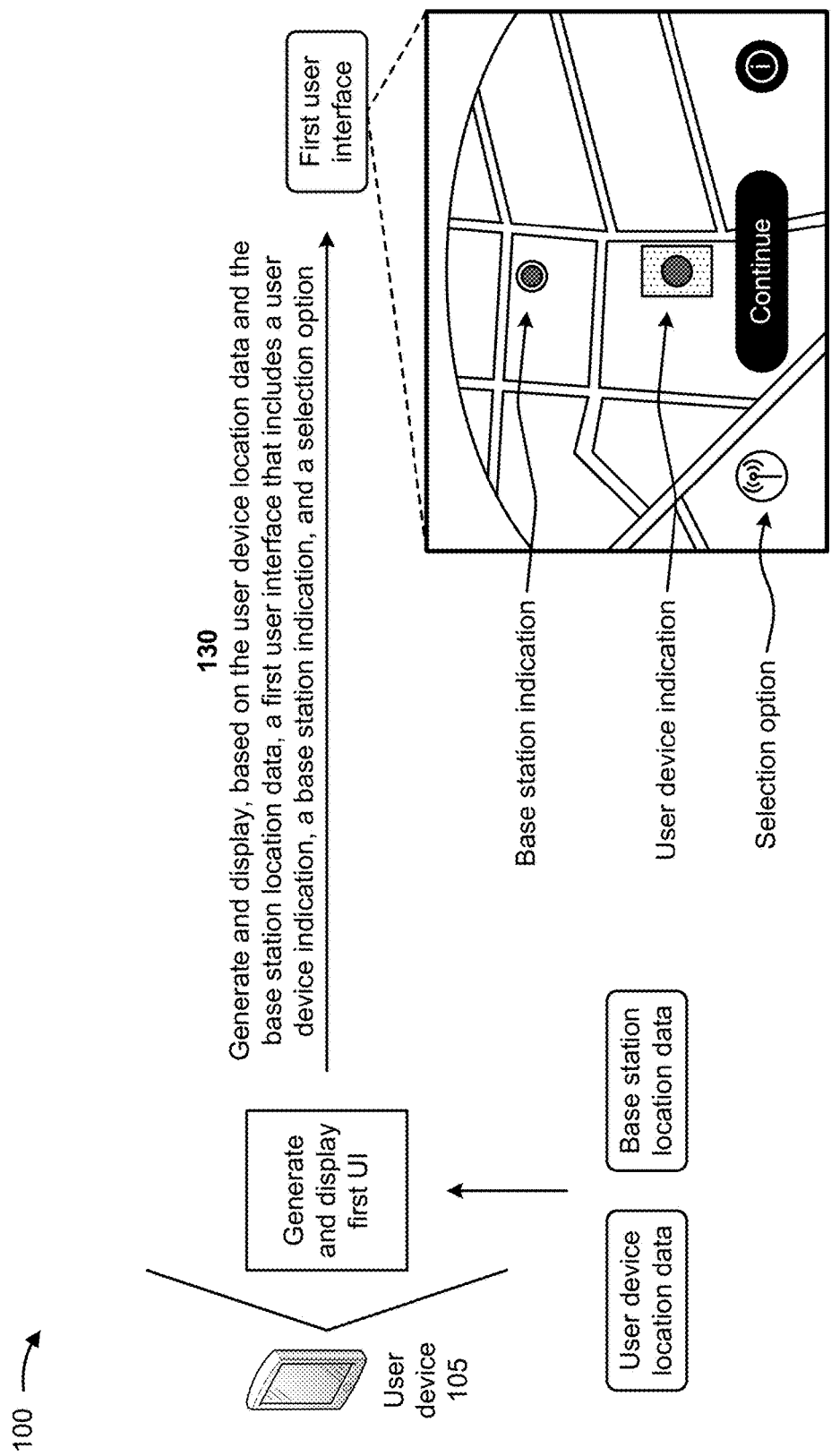

The following detailed description of example implementations refers to the accompanying drawings. The same reference numbers in different drawings may identify the same or similar elements.

A user device and a wireless network device (e.g., a wireless router, an Internet gateway, a receiver, a repeater, and/or the like) may be located at a customer premises. The user device may connect through a wireless network (e.g., a local network) with the wireless network device and may receive signals from the wireless network device. The user device and the wireless network device may connect to a network (e.g., a fifth generation (5G) network, a long-term evolution (LTE) network, a fourth generation (4G) network, a third generation (3G) network, and/or the like) to receive signals from the network. A signal strength of the network may vary from one room of the customer premises to another room of the customer premises and, sometimes, from one location to another location within the same room. Different types of obstructions (e.g., an object, a physical structure such as a wall, and/or a magnetic interference) may affect the signal strength.

A user may desire a greatest signal strength, from the network, for the wireless network device at the customer premises. The wireless network device may require a unique mounting/setup location at the customer premises based on available network resources (e.g., base stations) around the customer premises. However, the wireless network device needs to be provided a location of a network resource and network coverage at the customer premises to determine where to place the wireless network device. This may require the user to physically move the wireless network device to different locations until the greatest signal strength from the network is received by the wireless network device. The process of physically moving the wireless router to different locations can be tedious, inaccurate, impractical and time consuming.

Additionally, each time the wireless network device is moved from one location to another location, the wireless network device may be rebooted and reconnected to devices located in the customer premises and/or to the network. Thus, the current technique of physically moving the wireless network device in search of the greatest signal strength from the network wastes computing resources, network resources, human resources, and/or other resources associated with rebooting the wireless network device and reconnecting the wireless network device to the devices located in the customer premises and/or the network, handling customer complaints associated with poor network signal reception by the wireless network device, and/or selecting a sub-optimal location for the wireless network device, among other examples.

Some implementations described herein provide a user device that utilizes augmented reality to identify an optimal location for providing a wireless network device based on base station resources. For example, the user device may provide, to a network associated with a base station, user device location data identifying a latitude, a longitude, and a heading of the user device associated with a customer premises, and may receive, based on providing the user device location data, base station location data identifying a latitude, a longitude, and signal coverage of the base station. The user device may display, based on the user device location data and the base station location data, a first user interface that includes a user device indication, a base station indication, and a selection option, and may receive a selection of the selection option. The user device may retrieve camera view data and sensor data associated with the user device based on the selection and may display, based on the camera view data and the sensor data, a second user interface that includes the first user interface overlaid on a camera view of the user device, an augmented reality-based signal strength directional indicator, and an augmented reality-based base station location representation associated with the base station at the customer premises. The user device may receive, based on user navigation via the second user interface, information indicating that the user device is located at an optimal signal strength location associated with the base station at the customer premises, and may perform one or more actions based on the information indicating that the user device is located at the optimal signal strength location associated with the base station at the customer premises.

In this way, the user device utilizes augmented reality to identify an optimal location for providing a wireless network device. For example, the user device may guide a user to a setup location inside a customer premises by visualizing a base station (e.g., a network resource) outside the customer premises in an augmented reality user interface. The user can move around the customer premises to determine an optimal setup location for the wireless network device with the help of an augmented reality indicator (e.g., arrow, lines, dots, and/or the like) and a location of the base station using real-time network coverage data.

FIGS. 1A-1G are diagrams of one or more examples 100 associated with utilizing augmented reality (AR) to identify an optimal location (e.g., at a customer premises) for providing a wireless network device. As shown in FIGS. 1A-1G, example(s) 100 may include a user device 105 associated with a base station 110 and a network 115.

Further details of the user device 105, base station 110, and network 115 are provided below.

As shown in FIG. 1A, the user device 105 may wish to access the base station 110 and the network 115 (e.g., to facilitate identifying an optimal location at the customer premises for providing the wireless network device). For example, with reference to FIG. 1A, the user device 105 may establish a connection (e.g., a radio resource control (RRC) connection) with the base station 110 of the network 115. In some implementations, the base station 110 may broadcast a signal, and the user device may receive the signal and may establish a connection with the base station 110 based on receiving the signal.

As further shown in FIG. 1A, and by reference number 120, the user device 105 may provide user device location data (e.g., that is obtained from a sensor, such as a global positioning system (GPS) and/or location sensor, of the user device 105) to the base station 110. For example, the user device 105 may provide the user device location data to the base station 110 when the user device 105 is located at the customer premises at which the network device is to be set up. The user device location data may identify a latitude, a longitude, and/or a heading (e.g., a navigational heading) of the user device 105. In this way, the user device 105 may provide information to the network 115 that indicates a location of the user device 105 at or within the customer premises.

The base station 110, or another device associated with the network 115, may identify (e.g., based on receiving the user device location data from the user device 105) base station location data associated with the base station 110. The base station location data may identify a latitude, a longitude, and/or a signal coverage (e.g., indicating a coverage area and/or a signal strength, among other examples) of the base station 110 and/or one or more other base stations (e.g., that are able to provide a connection to the network 115 for the wireless network device at the customer premises). The base station 110 may provide the base station location data to the user device 105. Accordingly, as further shown in FIG. 1A, and by reference number 125, the user device 105 may receive the base station location data.

As shown in FIG. 1B, and by reference number 130, the user device 105 may generate and display (e.g., based on the user device location data and/or the base station location data) a first user interface (e.g., on a display screen of the user device 105). The first user interface may include a user device indication, one or more base station indications, and/or a selection option. For example, as shown in FIG. 1B, the first user interface may depict a map that includes a user device indication (e.g., shown as a shaded circle) that indicates a location of the user device 105 (e.g., at or within the customer premises, shown as a shaded rectangle), a base station indication (e.g., shown as a shaded, ringed circle) that indicates a location of the base station 110. As further shown in FIG. 1B, the first user interface may include a selection option (e.g., shown as an antenna icon) that may be associated with selecting the base station 110 for identification of the optimal strength location associated with the base station 110 at the customer premises. In some implementations, the base station 110 may be one of a plurality of base stations that are associated with the customer premises (e.g., a plurality of base stations that are able to provide a connection to the network 115 for the wireless network device at the customer premises). The selection option may indicate (e.g., in a selectable list) the base station 110 and/or one or more of the other base stations of the plurality of base stations.

Figure 1C:
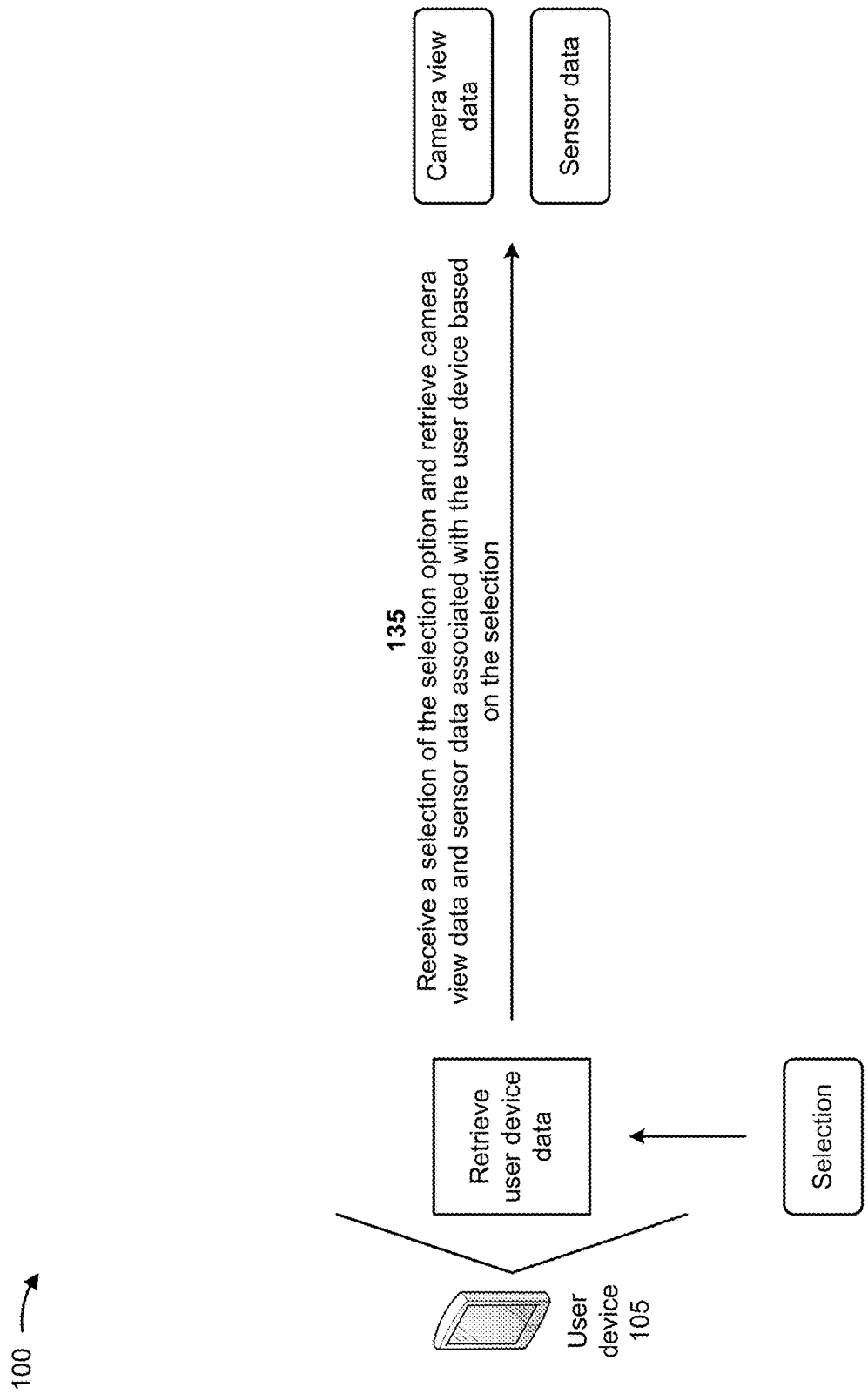

As shown in FIG. 1C, and by reference number 135, the user device 105 may receive a selection of the selection option. For example, a user of the user device 105 may interact with the first user interface and/or the selection option to select the base station 110 (e.g., to select the base station 110 from the selectable list as the base station that is to provide a connection to network 115 for the wireless network device at the customer premises). Accordingly, based on the selection, the user device 105 may retrieve camera view data and/or sensor data associated with the user device 105. For example, the user device 105 may cause a camera of the user device 105 (e.g., that is aligned with the heading of the user device 105) to capture camera view data that includes one or more images of a view (e.g., a field of view) of the camera (e.g., one or more images of the customer premises in a direction of the heading of the user device 105). In another example, the user device 105 may cause a sensor, such as an accelerometer, a GPS, a gyroscope, a motion sensor, and/or a magnetometer of the user device 105 to capture sensor data that identifies the location of the user device 105 (e.g., the latitude and/or longitude of the user device 105), the heading of the user device 105 (e.g., the navigational heading of the user device 105), and/or a motion of the user device 105 (e.g., a direction in which the user device 105 is moving).

As shown in FIG. 1D, and by reference number 140, the user device 105 may generate and display (e.g., based on the base station location data, the camera view data, and/or the sensor data) a second user interface (e.g., on the display screen of the user device 105). The second user interface may include the first user interface (e.g., that includes the user device indication, the base station indication, and/or the selection option), an AR-based signal strength directional indicator (e.g., an arrow, lines, dots, and/or the like), and/or an AR-based base station location representation (e.g., an image that represents a direction in which the base station 110 is located). The user device 105 may overlay the first user interface, the augmented reality-based signal strength directional indicator, and/or the augmented reality-based base station location representation on the camera view to generate the second user interface and may display the second user interface.

In some implementations, the user device 105 may generate the camera view based on the camera view data. For example, the camera view may include one or more portions of the one or more images captured by the camera of the user device 105 (e.g., one or more portions of the one or more images of the customer premises in the direction of the heading of the user device 105).

In some implementations, the user device 105 may generate the AR-based signal strength directional indicator based on the sensor data and/or the base station location data. For example, the user device 105 may determine, based on the base station location data, the location of the base station 110 and may determine, based on the sensor data, the location of the user device 105 and the heading of the user device 105. Accordingly, the user device 105 may determine a position of the base station 110 (e.g., that was selected) relative to the user device 105 and may determine an amount (e.g., represented in degrees) that the heading of the user device 105 is turned away from the base station 110. The user device 105 may generate the AR-based signal strength directional indicator to indicate the amount that the heading of the user device 105 is turned away from the base station 110 and/or a direction in which the user device 105 is to be rotated to cause the heading of the user device 105 to be pointed at the base station 110. As further described herein in relation to FIGS. 1E-1F, the AR-based signal strength directional indicator may be displayed when the heading of the user device 105 is not pointed at the base station 110.

In some implementations, the user device 105 may generate the AR-based base station location representation based on the sensor data and/or the base station location data. For example, the user device 105 may determine, based on the base station location data, the location of the base station 110 and may determine, based on the sensor data, the location of the user device 105 and the heading of the user device 105. Accordingly, the user device 105 may determine the position of the base station 110 relative to the user device 105 and may generate the AR-based base station location representation to indicate the relative position of the base station 110. As further described herein in relation to FIGS. 1E-1F, the AR-based base station location representation may be an image or icon (e.g., an antenna image or icon) that is displayed when the heading of the user device 105 is pointed near the base station 110 (e.g., (e.g., within an angle threshold, such as 5 degrees, such that the AR-based base station location representation can be overlaid on the camera view within the second user interface).

As further shown in FIG. 1D, and by reference number 145, the user device 105 may provide feedback based on user navigation via the second user interface. For example, the user of the user device 105 may interact with the second user interface by moving the user device 105 (e.g., changing the heading of the user device 105 and/or the location of the user device 105). This may cause the user device 105 to update some or all of the second user interface and display the updated second user interface (e.g., cause the user device 105 to overlay an updated augmented reality-based signal strength directional indicator and/or an updated augmented reality-based base station location representation on an updated camera view). In some implementations, the user device 105 may provide audible, visual, and/or tactile feedback based on the user navigation via the second user interface. For example, the user device 105 may provide audible and/or visual instructions on how much the user device 105 should be rotated to cause the heading of the user device 105 to be pointed at the base station 110. As another example, the user device 105 may provide tactile feedback (e.g., a vibration) when the heading of the user device 105 is pointed at or near the base station 110 (e.g., within an angle threshold, such as about 5 degrees).

Figure 1E:
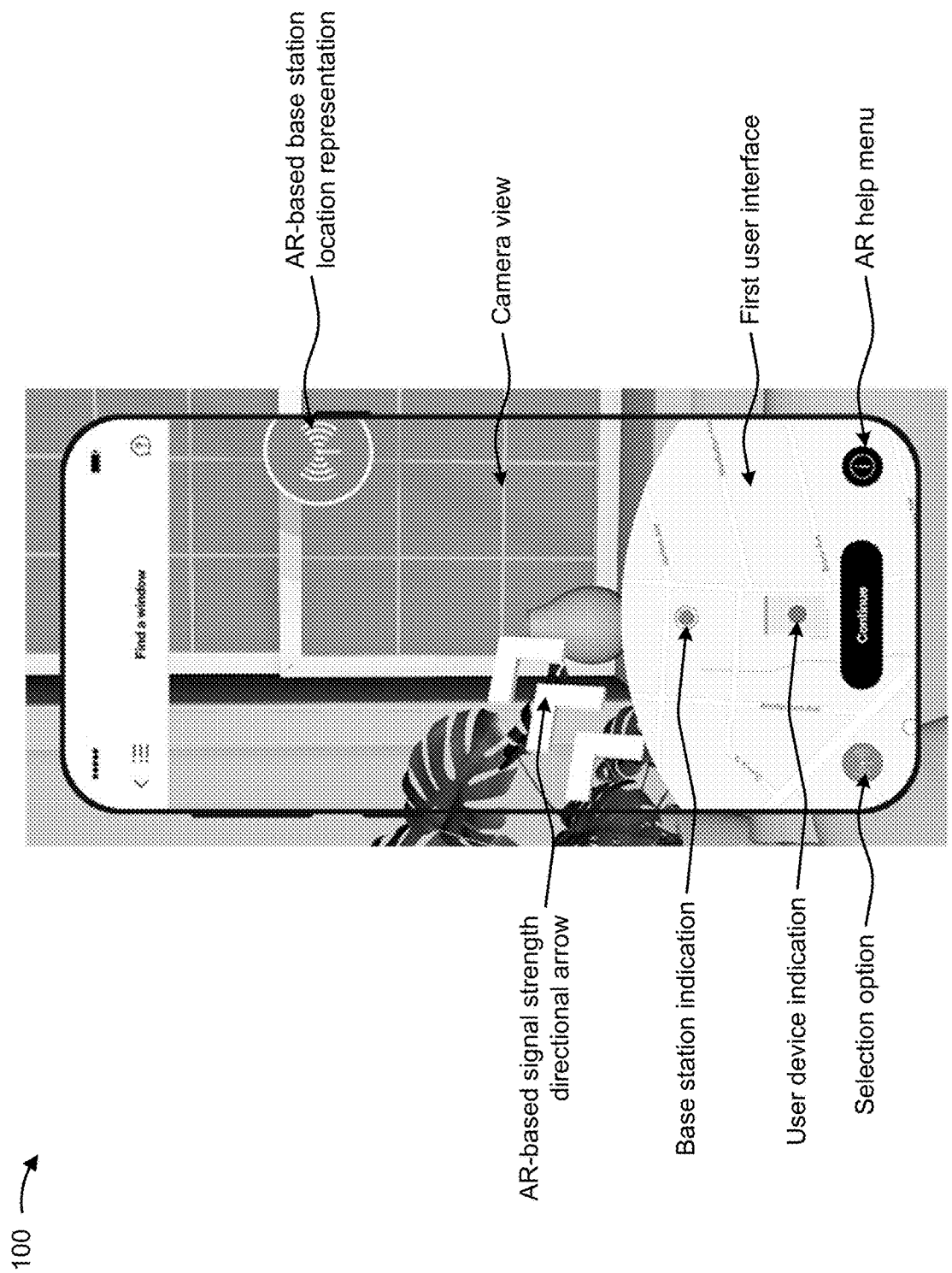

FIG. 1E shows an example illustration of the second user interface displayed on the user device 105 (e.g., on the display screen of the user device 105). As shown in FIG. 1E, the second user interface may include a first user interface (e.g., that includes a user device indication and/or a base station indication on a map and/or a selection option), an AR-based signal strength directional indicator, and/or an AR-based base station location representation overlaid on a camera view (e.g., that includes an image showing a view of a camera of the user device 105 that is pointed in a direction of the heading of the user device 105).

As further shown in FIG. 1E, the second user interface may provide additional directional guidance, such as "Find a window," to facilitate identification of the optimal signal strength location. Additionally, or alternatively, the second user interface may provide an AR help menu that includes help information, such as how a user is to move the user device 105 and/or to interact with the second user interface, to facilitate identification of the optimal signal strength location.

Figure 1F:
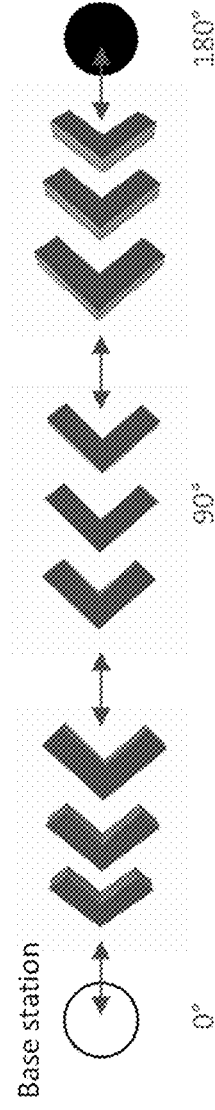
Figure 1F:
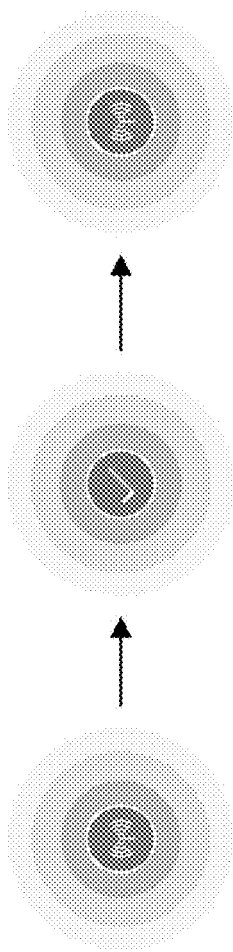

As shown in FIG. 1F, and by reference number 150, the AR-based signal strength directional indicator may be three-dimensional and may be rotatable. For example, as shown in FIG. 1F, the AR-based signal strength directional indicator may appear to rotate based on an amount (e.g., represented in degrees) that the heading of the user device 105 is turned away from the base station 110. As further shown in FIG. 1F, and by reference number 155, the AR-based base station location representation may be an antenna icon. When the heading of the user device 105 is pointed at the base station 110, the AR-based base station location representation may change to a check mark (e.g., to indicate that the optimal signal strength location has been identified).

Figure 1G:
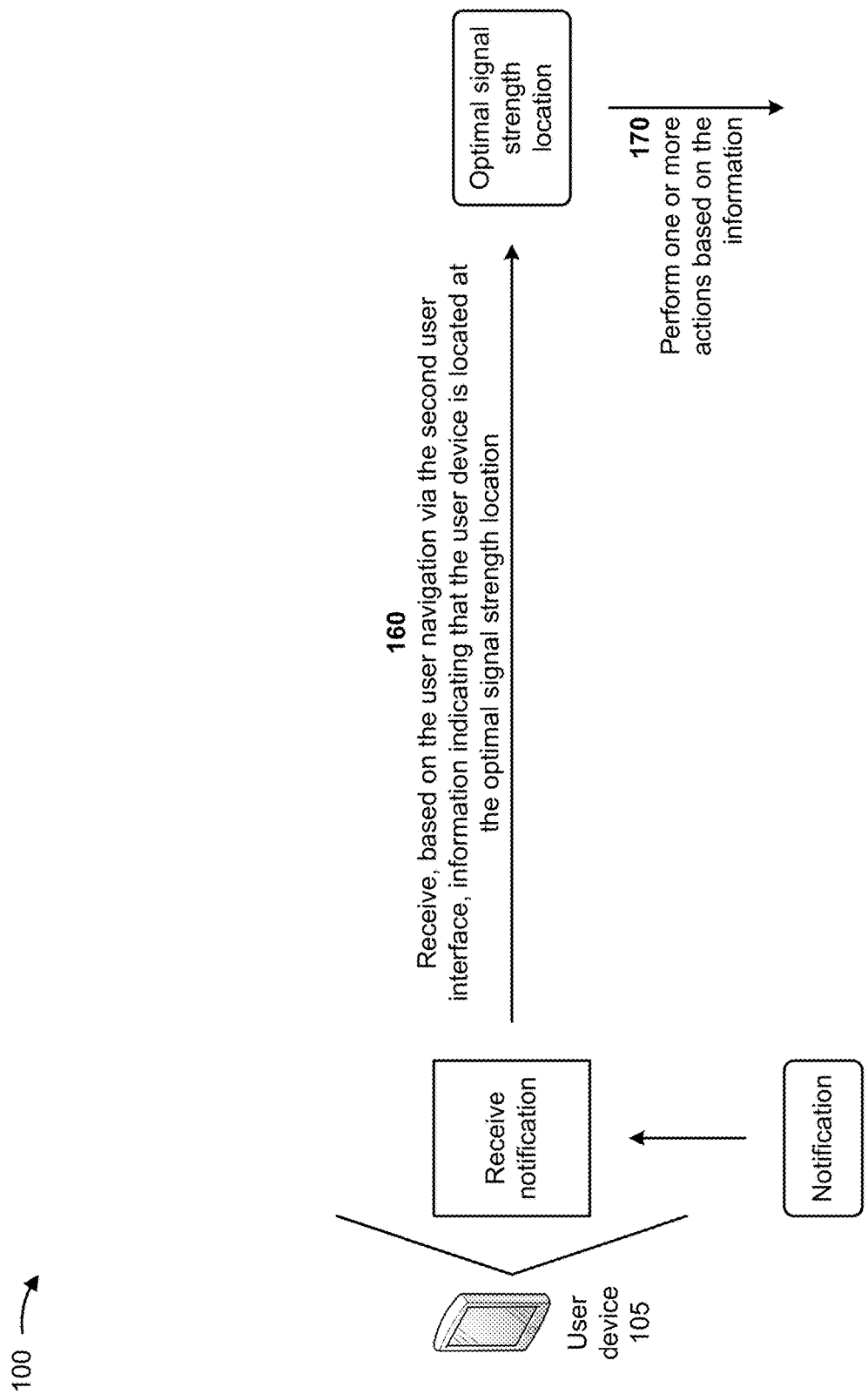

As shown in FIG. 1G, and by reference number 160, the user device 105 may receive (e.g., based on the user navigation via the second user interface), information indicating that the user device 105 is located at an optimal signal strength location (e.g., an optimal signal strength location associated with the base station 110 at the customer premises). In some implementations, the information indicating that the user device 105 is located at the optimal signal strength location may include visual information indicating that the user device 105 is located at the optimal signal strength location, audible information indicating that the user device 105 is located at the optimal signal strength location, and/or tactile information indicating that the user device 105 is located at the optimal signal strength location. For example, as described above, the AR-based base station location representation may change to a check mark. As another example, a visual notification (e.g., that includes text indicating that the user device 105 is located at the optimal signal strength location) may be displayed (e.g., on the display screen of the user device 105), an audible notification (e.g., that includes a sound indicating that the user device 105 is located at the optimal signal strength location) may be presented (e.g., via a speaker of the user device 105), and/or a tactile notification (e.g., that includes a vibration indicating the user device 105 is located at the optimal signal strength location) may be generated (e.g., by a vibration component of the user device 105).

As further shown in FIG. 1G, and by reference number 170, the user device 105 may perform one or more actions based on the information indicating that the user device 105 is located at the optimal signal strength location. In some implementations, the one or more actions may include displaying a textual instruction to mount the wireless network device at the optimal signal strength location and/or providing an audio instruction to mount the wireless network device at the optimal signal strength location. In this way, the user of the user device 105 may be informed that the network device is to be mounted and/or set up at the optimal signal strength location (e.g., to enable the network device to receive a signal with an optimal signal strength from the base station 110 for connecting to the network 115).

In some implementations, the one or more actions may include displaying instructions (e.g., text, animation, video, etc.) that indicates (e.g., shows, illustrates, and/or describes, among other examples) how to mount and/or set up the wireless network device at the optimal signal strength location and/or displaying multiple user interfaces that indicate (e.g., show, illustrate, and/or describe, among other examples) how to mount and/or set up the wireless network device at the optimal signal strength location. In this way, the user of the user device 105 may be informed on how to mount and/or set up the wireless network device at the optimal signal strength location (e.g., to enable the network device to receive a signal with an optimal signal strength from the base station 110 for connecting to the network 115).

In this way, user device 105 may utilize augmented reality to identify an optimal location for providing a wireless network device. For example, user device 105 may guide a user to a setup location inside a customer premises by visualizing the base station 110 outside the customer premises in an augmented reality user interface. The user can move around the customer premises to determine an optimal setup location for the wireless network device with the help of an augmented reality directional indicator and a location of base station 110 using real-time network coverage data. Thus, user device 105 may conserve computing resources, networking resources, human resources, and other resources that would have otherwise been consumed by rebooting the wireless network device and reconnecting the wireless network device to the devices located in the customer premises and/or network 115, handling customer complaints associated with poor network signal reception by the wireless network device, selecting a sub-optimal location for the wireless network device, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
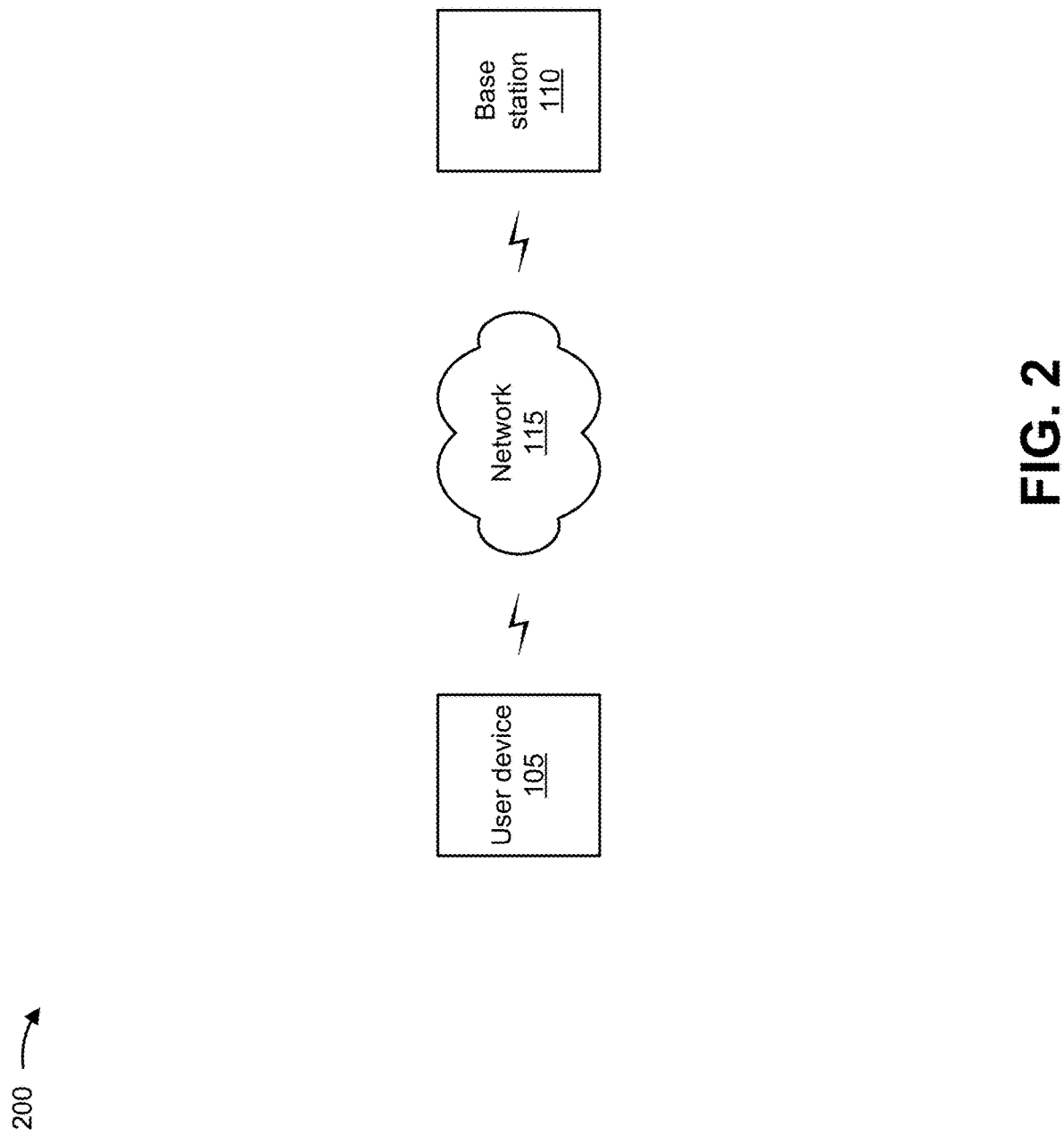
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user device 105, base station 110, and network 115.

User device 105 includes one or more devices capable of receiving, generating, storing, processing, and/or providing information associated with utilizing augmented reality to identify an optimal location for providing a wireless network device, as described elsewhere herein. User device 105 may include a communication device and/or a computing device. For example, user device 105 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), or a similar type of device. User device 105 may communicate with one or more other devices of environment 200, as described elsewhere herein.

Base station 110 includes one or more devices capable of transferring traffic, such as audio, video, text, and/or other traffic, destined for and/or received from user device 105. For example, base station 110 may include an eNodeB (eNB) associated with an LTE network that receives traffic from and/or sends traffic to a core network, a gNodeB (gNB) associated with a radio access network (RAN) of a 5G network, a base transceiver station, a radio base station, a base station subsystem, a cellular site, a cellular tower, an access point, a transmit receive point (TRP), a radio access node, a macrocell base station, a microcell base station, a picocell base station, a femtocell base station, and/or another network entity capable of supporting wireless communication.

Network 115 may include a core network or a RAN that includes one or more base stations 110 that take the form of eNBs, gNBs, among other examples, via which user device 105 (e.g., a mobile phone, a laptop computer, a tablet computer, a desktop computer, among other examples) communicates with a core network. Network 115 may include one or more wired and/or wireless networks. For example, network 115 may include a cellular network (e.g., a 5G network, an LTE network, a 3G network, a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, among other examples, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
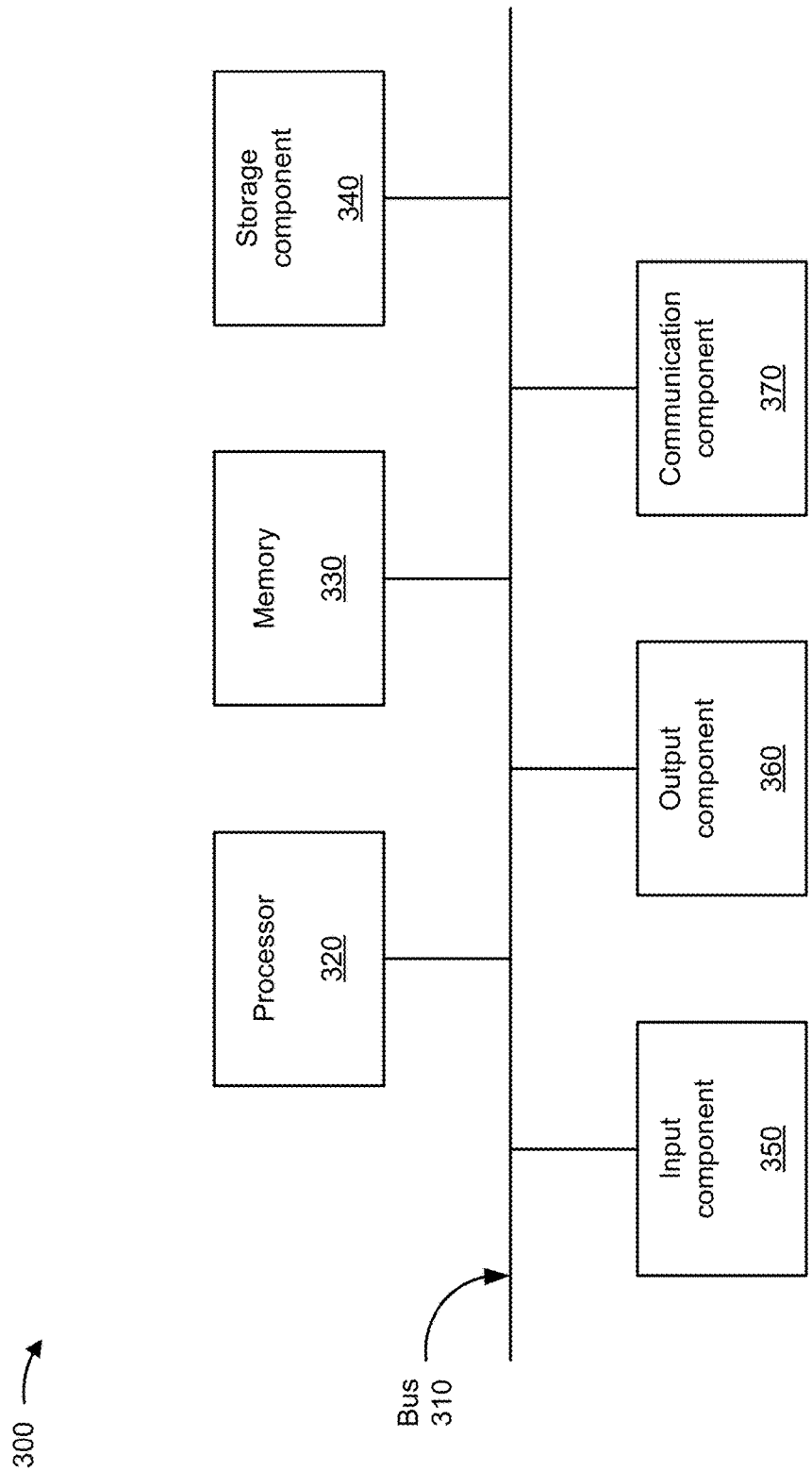
FIG. 3 is a diagram of example components of one or more devices of FIG. 2.

FIG. 3 is a diagram of example components of a device 300, which may correspond to user device 105 and/or base station 110. In some implementations, user device 105 and/or base station 110 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, a motion sensor, a magnetometer, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
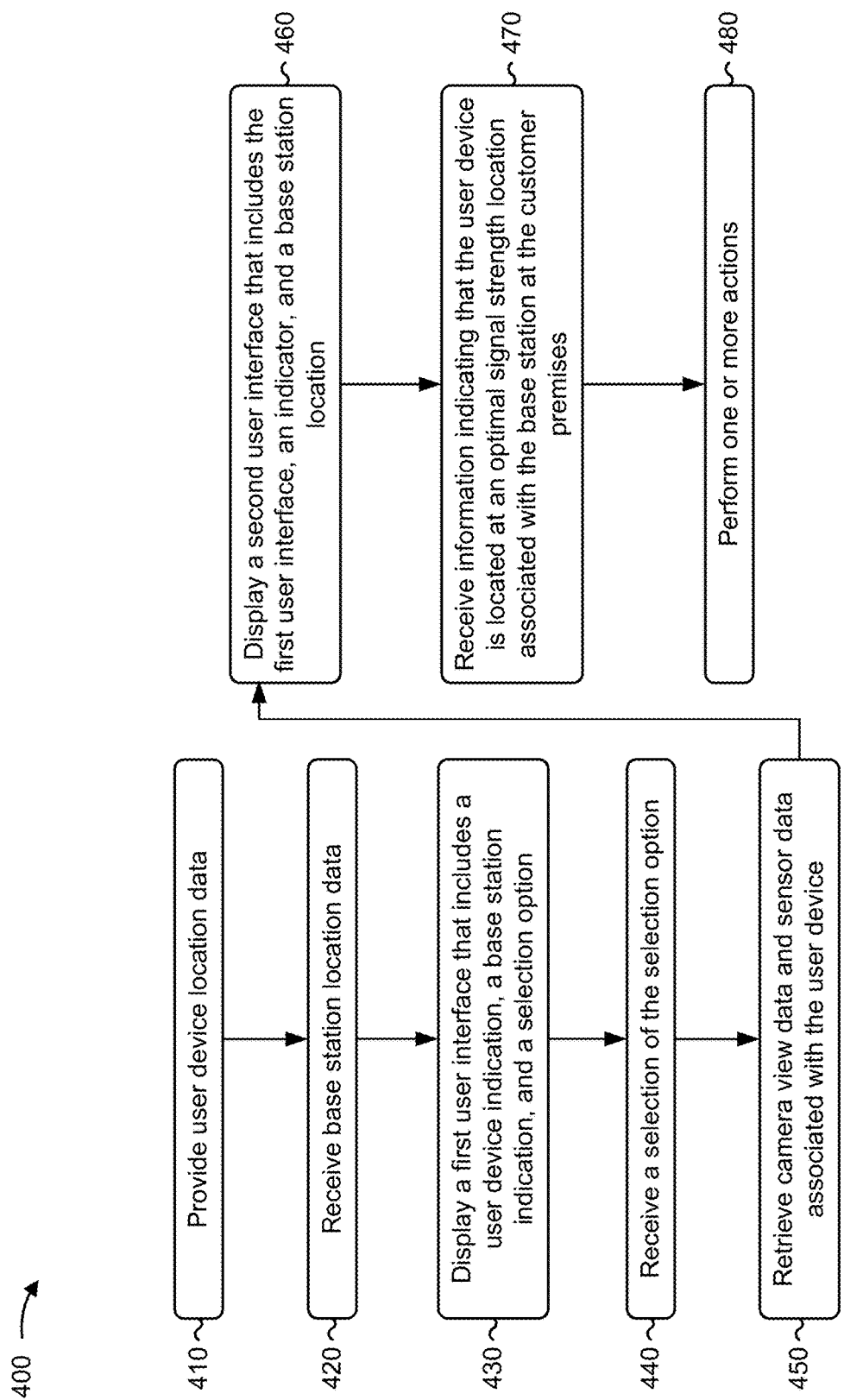
FIG. 4 is a flowchart of an example process associated with utilizing augmented reality to identify an optimal location for providing a wireless network device.

FIG. 4 is a flowchart of an example process 400 associated with utilizing augmented reality to identify an optimal location for providing a wireless network device. In some implementations, one or more process blocks of FIG. 4 may be performed by a user device (e.g., user device 105). In some implementations, one or more process blocks of FIG. 4 may be performed by another device or a group of devices separate from or including the user device, such as a base station (e.g., base station 110). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include providing user device location data (block 410). For example, the user device may provide, user device location data identifying a latitude, a longitude, and a heading of the user device associated with a customer premises, as described above.

As further shown in FIG. 4, process 400 may include receiving base station location data (block 420). For example, the user device may receive, base station location data identifying a latitude, a longitude, and signal coverage of a base station, as described above.

As further shown in FIG. 4, process 400 may include displaying a first user interface that includes a user device indication, a base station indication, and a selection option (block 430). For example, the user device may display, based on the user device location data and the base station location data, a first user interface that includes a user device indication, a base station indication, and a selection option, as described above.

As further shown in FIG. 4, process 400 may include receiving a selection of the selection option (block 440). For example, the user device may receive a selection of the selection option, as described above.

As further shown in FIG. 4, process 400 may include retrieving camera view data and sensor data associated with the user device (block 450). For example, the user device may retrieve camera view data and sensor data associated with the user device based on the selection, as described above.

As further shown in FIG. 4, process 400 may include displaying a second user interface that includes the first user interface, an indicator, and a base station location (block 460). For example, the user device may display, a second user interface that includes the first user interface overlaid on a camera view of the user device, an augmented reality-based signal strength directional indicator, and an augmented reality-based base station location representation associated with the base station near the customer premises, as described above.

As further shown in FIG. 4, process 400 may include receiving information indicating that the user device is located at an optimal signal strength location associated with the base station at the customer premises (block 470). For example, the user device may receive, based on user navigation via the second user interface, information indicating that the user device is located at an optimal signal strength location associated with the base station near the customer premises, as described above.

As further shown in FIG. 4, process 400 may include performing one or more actions (block 480). For example, the user device may perform one or more actions based on the information indicating that the user device is located at the optimal signal strength location associated with the base station near the customer premises, as described above.

Process 400 may include additional implementations, such as any single implementation or any combination of implementations described below and/or in connection with one or more other processes described elsewhere herein.

In a first implementation, process 400 includes providing audible, visual, or tactile feedback based on the user navigation via the second user interface.

In a second implementation, alone or in combination with the first implementation, the selection option is associated with selecting the base station for identification of the optimal signal strength location associated with the base station at the customer premises.

In a third implementation, alone or in combination with one or more of the first and second implementations, displaying the second user interface includes generating the camera view of the user device based on the camera view data; generating the augmented reality-based signal strength directional indicator based on the sensor data; generating the augmented reality-based base station location representation associated with the base station at the customer premises based on sensor data and the base station location data; overlaying the first user interface, the augmented reality-based signal strength directional indicator, and the augmented reality-based base station location representation on the camera view to generate the second user interface; and displaying the second user interface.

In a fourth implementation, alone or in combination with one or more of the first through third implementations, the information indicating that the user device is located at the optimal signal strength location associated with the base station near the customer premises includes one or more of visual information indicating that the user device is located at the optimal signal strength location, audible information indicating that the user device is located at the optimal signal strength location, or tactile information indicating that the user device is located at the optimal signal strength location.

In a fifth implementation, alone or in combination with one or more of the first through fourth implementations, performing the one or more actions includes one or more of displaying a textual instruction, providing an audio instruction, or providing both the textual instruction and the audio instruction.

In a sixth implementation, alone or in combination with one or more of the first through fifth implementations, performing the one or more actions includes one or more of displaying a video showing how to mount a wireless network device at the optimal signal strength location associated with the base station at the customer premises or displaying multiple user interfaces showing how to mount the wireless network device at the optimal signal strength location associated with the base station at the customer premises.

In a seventh implementation, alone or in combination with one or more of the first through sixth implementations, the augmented reality-based signal strength directional indicator is oriented to point toward the augmented reality-based base station location representation associated with the base station at the customer premises.

In an eighth implementation, alone or in combination with one or more of the first through seventh implementations, process 400 includes displaying help information identifying how to locate the optimal signal strength location associated with the base station at the customer premises.

In a ninth implementation, alone or in combination with one or more of the first through eighth implementations, the augmented reality-based signal strength directional indicator is three dimensional and rotatable based on the heading of the user device.

In a tenth implementation, alone or in combination with one or more of the first through ninth implementations, the second user interface provides additional directional guidance to the optimal signal strength location associated with the base station at the customer premises.

In an eleventh implementation, alone or in combination with one or more of the first through tenth implementations, the network includes one of a fifth-generation network, a fourth-generation network, or a third-generation network.

In a twelfth implementation, alone or in combination with one or more of the first through eleventh implementations, the base station is included in plurality of base stations associated with the customer premises and receiving the selection of the selection option includes receiving a selection of the base station, from the plurality of base stations, as the selection option.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
providing, by a user device, user device location data identifying a latitude, a longitude, and a heading of the user device associated with a customer premises;

receiving, by the user device, base station location data identifying a latitude, a longitude, and signal coverage of a base station;

displaying, by the user device, based on the user device location data and the base station location data, a first user interface that includes a user device indication, a base station indication, and a selection option;

receiving, by the user device, a selection of the selection option;

upon receiving the selection, retrieving, by the user device, camera view data and sensor data associated with the user device based on the selection;

displaying, by the user device, a second user interface that includes the first user interface overlaid on a camera view of the user device, an augmented reality-based signal strength directional indicator, and an augmented reality-based base station location representation associated with the base station near the customer premises, wherein displaying the augmented reality-based base station location representation associated with the base station near the customer premises is based on a navigational heading of the user device being pointed within a threshold angle range of the base station near the customer premises, wherein displaying the augmented reality-based base station location representation associated with the base station near the customer premises comprises providing instructions indicating an amount to rotate the user device to cause the navigational heading of the user device to be pointed within the threshold angle range are provided based on the user device being presently pointed outside the threshold angle range, and wherein the augmented reality-based signal strength directional indicator is a three-dimensional indicator that appears to rotate based on a particular amount that the navigational heading of the user device is turned away from the base station near the customer premises;

receiving, by the user device, based on user navigation via the second user interface, information indicating that the user device is located at an optimal signal strength location associated with the base station near the customer premises; and performing, by the user device, one or more actions based on the information indicating that the user device is located at the optimal signal strength location associated with the base station at the customer premises.

2. The method of claim 1, further comprising:
providing audible feedback, visual feedback, or tactile feedback based on the user navigation via the second user interface.

3. The method of claim 1, wherein the selection option is associated with selecting the base station for identification of the optimal signal strength location associated with the base station near the customer premises.

4. The method of claim 1, wherein displaying the second user interface comprises:
generating the camera view of the user device based on the camera view data;
generating the augmented reality-based signal strength directional indicator based on the sensor data;
generating the augmented reality-based base station location representation associated with the base station at the customer premises based on sensor data and the base station location data;

overlaying the first user interface, the augmented reality-based signal strength directional indicator, and the augmented reality-based base station location representation on the camera view to generate the second user interface; and
displaying the second user interface.

5. The method of claim 1, wherein the information indicating that the user device is located at the optimal signal strength location associated with the base station near the customer premises includes one or more of:
visual information indicating that the user device is located at the optimal signal strength location,
audible information indicating that the user device is located at the optimal signal strength location, or
tactile information indicating that the user device is located at the optimal signal strength location.

6. The method of claim 1, wherein performing the one or more actions comprises one or more of:
displaying a textual instruction;
providing an audio instruction; or
providing both the textual instruction and the audio instruction.

7. The method of claim 1, wherein the augmented reality-based signal strength directional indicator is oriented to point toward the augmented reality-based base station location representation associated with the base station at the customer premises.

8. A user device, comprising:
one or more hardware processors configured to:
display, based on user device location data and base station location data, a first user interface that includes a user device indication, a base station indication, and a selection option,
wherein the user device location data identifies a latitude, a longitude, and a heading of the user device associated with a customer premises, and
wherein the base station location data identifies a latitude, a longitude, and signal coverage of a base station associated with a network;
receive a selection of the selection option;
retrieve, upon receiving the selection, camera view data and sensor data associated with the user device based on the selection;
display, based on the camera view data and the sensor data, a second user interface that includes the first user interface overlaid on a camera view of the user device, an augmented reality-based signal strength directional indicator, and an augmented reality-based base station location representation associated with the base station at the customer premises,
wherein the one or more hardware processors, to display the augmented reality-based signal strength directional indicator are configured to:
display the augmented reality-based signal strength directional indicator based on a navigational heading of the user device being pointed within a threshold angle range of the base station at the customer premises,
wherein the augmented reality-based signal strength directional indicator is a three-dimensional indicator that appears to rotate based on a particular amount that the navigational heading of the user device is turned away from the base station near the customer premises, and
provide instructions indicating an amount to rotate the user device to cause the navigational heading of the user device to be pointed within the threshold angle range based on the user device being pointed presently outside the threshold angle range;

receive, based on user navigation via the second user interface, information indicating that the user device is located at an optimal signal strength location associated with the base station at the customer premises; and perform one or more actions based on the information indicating that the user device is located at the optimal signal strength location associated with the base station at the customer premises.

9. The user device of claim 8, wherein the augmented reality-based signal strength directional indicator is oriented to point toward the augmented reality-based base station location representation associated with the base station at the customer premises.

10. The user device of claim 8, wherein the one or more hardware processors are further configured to:

display help information identifying how to locate the optimal signal strength location associated with the base station at the customer premises.

11. The user device of claim 8, wherein the augmented reality-based signal strength directional indicator is three dimensional and rotatable based on the heading of the user device.

12. The user device of claim 8, wherein the second user interface provides additional directional guidance to the optimal signal strength location associated with the base station at the customer premises.

13. The user device of claim 8, wherein the network includes one of a fifth-generation network, a fourth-generation network, or a third-generation network.

14. The user device of claim 8, wherein the base station is included in a plurality of base stations associated with the customer premises and, wherein the one or more hardware processors, to receive the selection of the selection option, are to:

receive a selection of the base station, from the plurality of base stations, as the selection option.

15. A non-transitory computer-readable medium storing a set of instructions, the set of instructions comprising:

one or more instructions that, when executed by one or more processors of a user device, cause the user device to:

provide, to a network associated with a base station, user device location data identifying a latitude, a longitude, and a heading of the user device associated with a customer premises;

receive, based on providing the user device location data, base station location data identifying a latitude, a longitude, and signal coverage of the base station;

display, based on the user device location data and the base station location data, a first user interface that includes a user device indication, a base station indication, and a selection option;

receive a selection of the selection option;

retrieve, upon receiving the selection, camera view data and sensor data associated with the user device based on the selection;

display, based on the camera view data and the sensor data, a second user interface that includes the first user interface overlaid on a camera view of the user device, an augmented reality-based signal strength directional indicator, and an augmented reality-based base station location representation associated with the base station at the customer premises, wherein the one or more instructions, to cause the one or more processors to display the augmented reality-based signal strength directional indicator, cause the one or more processors to:

display the augmented reality-based signal strength directional indicator based on a navigational heading of the user device being pointed within a threshold angle range of the base station at the customer premises, provide instructions indicating an amount to rotate the user device to cause the navigational heading of the user device to be pointed within the threshold angle range based on the user device being pointed presently outside the threshold angle range, and wherein the augmented reality-based signal strength directional indicator is a three-dimensional indicator that appears to rotate based on a particular amount that the navigational heading of the user device is turned away from the base station near the customer premises;

receive, based on user navigation via the second user interface, information indicating that the user device is located at an optimal signal strength location associated with the base station at the customer premises; and perform one or more actions based on the information indicating that the user device is located at the optimal signal strength location associated with the base station at the customer premises.

16. The non-transitory computer-readable medium of claim 15, wherein the one or more instructions further cause the user device to:

provide audible feedback, visual feedback, or tactile feedback based on the user navigation via the second user interface.

17. The non-transitory computer-readable medium of claim 15, wherein the one or more instructions, that cause the user device to display the second user interface, cause the user device to:

generate the camera view of the user device based on the camera view data;

generate the augmented reality-based signal strength directional indicator based on the sensor data;

generate the augmented reality-based base station location representation associated with the base station at the customer premises based on the sensor data and the base station location data;

overlay the first user interface, the augmented reality-based signal strength directional indicator, and the augmented reality-based base station location representation on the camera view to generate the second user interface; and display the second user interface.

18. The non-transitory computer-readable medium of claim 15, wherein the one or more instructions further cause the user device to one or more of:

display a textual instruction to mount a wireless network device at the optimal signal strength location associated with the base station at the customer premises;

provide an audio instruction to mount the wireless network device at the optimal signal strength location associated with the base station at the customer premises;

provide both the textual instruction and the audio instruction;

display a video showing how to mount the wireless network device at the optimal signal strength location associated with the base station at the customer premises; or display multiple user interfaces showing how to mount the wireless network device at the optimal signal strength location associated with the base station at the customer premises.

19. The non-transitory computer-readable medium of claim 15, wherein the augmented reality-based signal strength directional indicator is oriented to point toward the augmented reality-based base station location representation associated with the base station at the customer premises.

20. The non-transitory computer-readable medium of claim 15, wherein the augmented reality-based signal strength directional indicator is three dimensional and rotatable based on the heading of the user device.

\* \* \* \* \*